Figure 1:
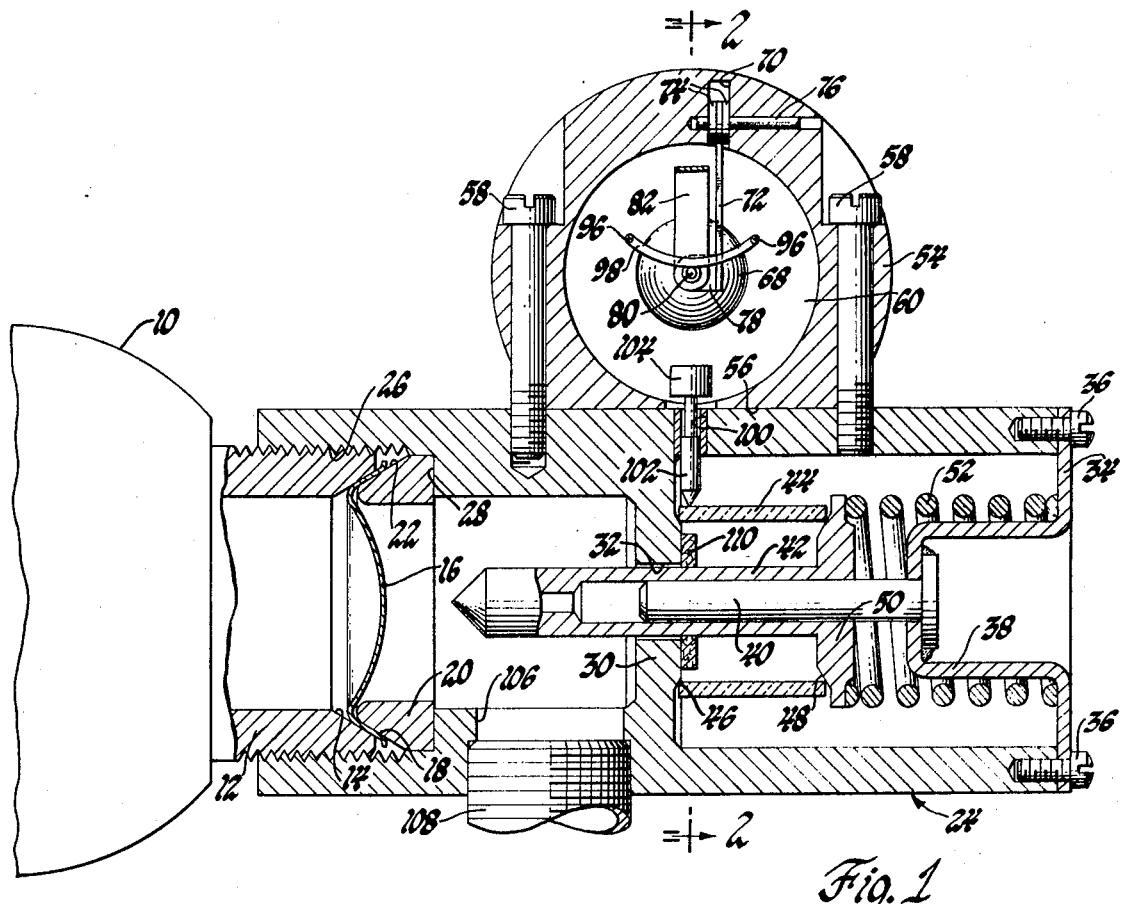

United States Patent
Ranft

[15] 3,648,897
[45] Mar. 14, 1972

[54] SENSOR AND TRIGGER MECHANISM
[72] Inventor: Ernst L. Ranft, Webster, N.Y.
[73] Assignee: General Motors Corporation, Detroit, Mich.
[22] Filed: Nov. 4, 1970
[21] Appl. No.: 86,895

[52] U.S. Cl. ............................................. 222/5
[51] Int. Cl. ............................................. B67b 7/24
[58] Field of Search ............ 222/5, 80, 82, 83; 180/91; 9/316, 318, 320, 324

[56] References Cited

UNITED STATES PATENTS

| | | | |
|---|---|---|---|
| 1,921,452 | 8/1933 | Bronander | 222/5 X |
| 2,468,369 | 4/1949 | Jones | 222/5 X |
| 2,593,552 | 4/1952 | Folkman | 222/82 UX |
| 2,853,126 | 9/1958 | Corlet | 222/5 |
| 3,084,705 | 4/1963 | Fever | 222/5 X |
| 3,266,668 | 8/1966 | Davis | 9/318 X |
| 3,494,506 | 2/1970 | Fujimoto | 9/318 X |
| 3,591,877 | 7/1971 | Schuler | 222/5 |

FOREIGN PATENTS OR APPLICATIONS

| | | | |
|---|---|---|---|
| 662,898 | 12/1951 | Great Britain | 222/5 |

Primary Examiner—Robert B. Reeves
Assistant Examiner—John P. Shannon, Jr.
Attorney—W. E. Finken and Herbert Furman

[57] ABSTRACT

A sensor and trigger mechanism includes a pressure vessel having an outlet secured to a cylindrical support member and sealed by a rupturable diaphragm. An axial guide pin on the support extends through an axial opening in an intermediate wall of the support and slidably supports a headed penetrator pin. The shank of the pin is freely received within the opening. Axially and radially tapered seats on the head of the pin and on the wall of the support seat the open ends of a hollow frangible glass cylinder. A compression spring seating between an end wall of the support and the head of the pin biases the pin toward the diaphragm and cooperates with the seats in applying a hoop stress to the glass cylinder. A ball of predetermined weight is seated on a conical pedestal and held against movement by a spring biased lever arm engaging the ball diametrically opposite the seat. The lever arm detents a torsional spring against engagement with a fragmentor pin. The fragmentor pin is slidably mounted in the wall of the support for engagement radially with the glass cylinder to fragmentize the cylinder. A felt washer seated on the intermediate wall sealingly engages the penetrator pin and provides a seal against movement of the glass fragments through the opening of the intermediate wall and also provides a resilient stop for the head of the penetrator pin after the pin penetrates the diaphragm.

5 Claims, 2 Drawing Figures

PATENTED MAR 14 1972

3,648,897

INVENTOR.
Ernst L. Ranft
BY
Herbert Furman
ATTORNEY

SENSOR AND TRIGGER MECHANISM

This invention relates generally to sensor and trigger mechanisms of the type including a hollow cylindrical frangible glass member normally locating a penetrating member out of engagement with a rupturable diaphragm sealing a pressure vessel.

The mechanism of this invention is similar to those shown and described in copending applications, Ser. No. 882,668 Zeigler et al., filed Dec. 5, 1969, and Ser. No. 882,669 Fairchild et al., filed Dec. 5, 1969, both assigned to the assignee of this invention.

One of the features of the mechanism of this invention is that a headed penetrator pin is normally spring biased into engagement with the diaphragm of the pressure vessel and axially and radially tapered seats on the head of the penetrator pin and an apertured wall of the support for the vessel engage the open ends of the cylindrical glass member to cooperate with the bias on the penetrator pin in applying a hoop stress to the glass member. Another feature of this invention is that a resilient member sealingly engages the penetrator pin adjacent the opening of the wall of the support to prevent the entry of glass fragments through this wall and into the stream of released fluid from the pressure vessel, with the resilient member also acting as a resilient stop upon engagement thereof by the head of the penetrator pin after rupture of the diaphragm.

Figure 2:
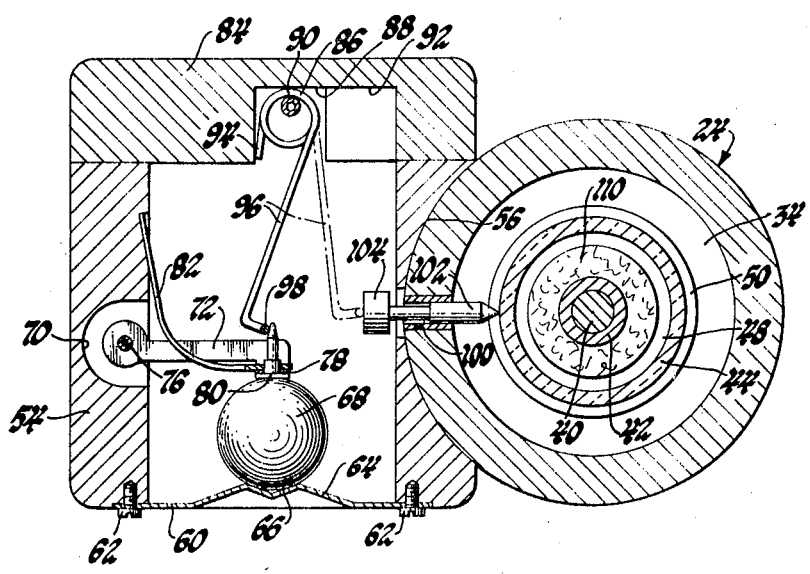

These and other features of the mechanism of this invention will be readily apparent from the following specification and drawings wherein:

FIG. 1 is a partially broken away view of a sensor and trigger mechanism according to this invention; and FIG. 2 is a sectional view taken generally along the plane indicated by line 2—2 of FIG. 1.

Referring now particularly to FIG. 1 of the drawings, the mechanism includes a conventional pressure vessel 10 containing compressible fluid, such as air or nitrogen, under pressure, such as in the range of 2,500 to 3,500 p.s.i. The pressure vessel includes an externally threaded cylindrical outlet 12 having an axially tapered inner wall 14 adjacent the end thereof. A conventional domed metal diaphragm 16 includes an angular peripheral flange 18 which seats against the wall 14. A washer 20 includes an axially tapered external wall 22 engaging the flange 18 of the diaphragm 16 opposite to wall 14. A generally cylindrical support 24 includes an internally threaded bore 26 at one end thereof which is threaded over the outlet 12. A radial shoulder 28 of the bore 26 engages the washer 20 to tightly clamp the flange 18 of the diaphragm between the walls 14 and 22 and thereby seal the outlet 12 of the pressure vessel so that the fluid contents of the vessel remain under pressure until release thereof.

The support 24 further includes an intermediate radial wall 30 apertured at 32. The other open end of the support 24 is closed by a cap 34 which is bolted at 36 to the support and includes a centrally apertured axial boss 38. The head of a guide pin 40 is welded to the base wall of the boss 38 and the shank of the guide pin extends through the opening in the base wall and within the aperture 32. An internally bored penetrating member 42 is slidably mounted on the shank of the guide pin. A hollow frangible glass cylinder 44 has one open end seating on a radially and axially tapered cylindrical boss or seat 46 of the wall 30 and the other open end seating on a like extending boss or seat 48 of the head 50 of member 42. Opposite to the seat 48, the head 50 of the penetrating member also seats one end of a coil compression spring 52, the other end of which seats on the cap 34.

The cylinder 44 is made of chemically treated glass which is commercially available under the name of Chem-Cor. Such glass has a compressive stress placed in its outer layer as a result of chemical treatment. The axially and radially tapered seats 46 and 48 and the spring 52 cooperate to apply a hoop stress to the glass cylinder so that the cylinder will fragmentize, as will be further described, with less force than a cylinder not subjected to hoop stress and will also fragmentize in radially outward directions as compared to radially inward directions.

An annular housing 54 includes a semi-cylindrical cutout 56 in the wall thereof so as to seat against the outer surface of the support 24 as can be seen in FIG. 2. The housing 54 is secured to the support by one or more bolts 58, FIG. 1. One end of the housing 54 is closed by a plate 60 bolted at 62 to a counterbored end wall of the housing. Plate 62 includes a central pedestal-type seat 64 which includes a generally conical seat 66. Seat 66 is formed as a cone of approximately 10° in the specific embodiment shown. A ball or spherical member 68 normally seats on the seat 66.

The housing 54 is provided with an inwardly opening groove 70 in the wall thereof and the apertured end of a lever 72 and a pair of like apertured washers 74 are received between the walls of this groove. The lever and washers are secured to each other and the lever is pivoted to the housing 54 by a pin 76 fitting within aligned bores in the housing to opposite sides of the walls of the groove. The free end of the lever 72 includes an apertured lateral arm or tab 78. A flat headed pin 80 is secured to the tab 78, with the head of the pin engaging the ball 68 diametrically opposite to the seat 66 and the tapered shank of the pin extending normal to the tab. A bowed leaf spring 82 extends between a groove in the wall of the housing 54 and the tab 78 to apply a biasing force biasing the lever 72 clockwise as viewed in FIG. 2 and biasing the ball 68 against the seat 66.

The other end of the housing 54 is closed by a cap 84 secured thereto in a suitable manner. The spaced coils 86, FIG. 2, of a yoke-type torsion spring are received within inwardly opening bores 88 of the cap 84 and are held against movement outwardly of the bores by a pin 90 extending across the cap 84 through aligned openings therethrough to each side of the bores 88. Narrower bores 92 extend from the bores 88 for a purpose to be hereinafter described. One leg 94 of each of the coils 86 engages a wall of a respective bore 88 and the other legs 96 of the coils are integrally joined by an arcuately shaped bight portion 98. Normally the bight portion 98 is engaged with the tapered shank of the pin 80 to thereby detent the legs 96 and bight portion 98 against movement from their full line position shown in FIG. 2 to their dotted line position shown therein. The bores 92 permit free movement of the legs 96 of the coils 86 relative to the cap 84.

The support 24 includes a bushed cylindrical bore 100 which slidably receives the shouldered shank of a fragmentor pin 102. The pointed end of the fragmentor pin shank normally lightly seats against the outer surface of the glass cylinder 44. Bore 100 opens to a larger diameter bore of the housing 54 and the head 104 of the fragmentor pin is normally located within the housing 54 immediately adjacent the larger diameter bore.

The torsion spring, in the embodiment shown, is wound up to supply approximately 12 inch-ounces of energy which is normally stored in the spring by the detented engagement of the bight 98 with the tapered shank of the pin 80.

When an acceleration pulse of predetermined amplitude and time is received by the ball 68, the ball will slide out of engagement with the head of the pin 80 and the seat 66 to thereby permit the lever 72 to move clockwise as viewed in FIG. 2 under the action of the spring 82. This moves the tapered shank of the pin 80 out of engagement with the bight portion 98 of the torsion spring and permits the bight portion to move into engagement with the head 104 of the fragmentor pin 102. The fragmentor pin is thereby driving into the outer surface of the glass cylinder 44 to fragmentize the glass cylinder or break it into fragments which are generally spherical in nature rather than being sharp-pointed. The hoop stress applied to the glass cylinder by the seats 46 and 48 in cooperation with the spring 52 tends to force the fragments of the glass cylinder to move radially outwardly with respect to the support 24.

Upon fragmentizing of the cylinder 44, the spring 52 drives the penetrating member 42 to the left and into engagement with the dome portion of the diaphragm 16 to thereby initiate rupture of the diaphragm and release of the contents of the pressure vessel 10. The contents of the pressure vessel flow outwardly or to the right through the outlet 12 and then flow at right angles or radially of the support 24 outwardly through a radial opening 106 into a conduit or manifold 108 which connects with an inflatable occupant restraint cushion in a conventional manner to thereby inflate the cushion.

A cylindrically shaped apertured washer 110 of felt or other suitable resilient material seats on the wall 30 adjacent the aperture 32 and sealingly engages the shank of the penetrating member 42. The washer 110 assures that none of the fragments of the glass cylinder 44 will pass through the aperture 32 and thence be drawn into the released pressure fluid so as to be passed through the conduits connecting the pressure vessel with the inflatable cushion. The engagement of this washer by the head 50 of the penetrating member provides a resilient stop for the head of the penetrating member and additionally provides a seal for the aperture 32 to ensure that the pressure fluid from the vessel 10 turns radially and flows outwardly through the bore 106 rather than passing between the shank of the penetrator pin and the aperture 32 into the portion of the housing 24 to the right of wall 30.

Thus, this invention provides an improved sensor and trigger mechanism.

I claim:

1. The combination comprising, a support, a pressure vessel containing pressure fluid and sealed by a penetratable seal, a penetrating member movably mounted on the support and engageable with the seal to penetrate the seal and release the pressure fluid, means biasing the penetrating member into engagement with the seal, a generally hollow cylindrical frangible glass member engageable with the penetrating member and support to limit movement of the penetrating member relative to the support, means applying a hoop stress to the frangible glass member, fragmentizing means engageable with the glass member upon receipt thereof of an acceleration pulse of predetermined amplitude and time to fragmentize the glass member and release the penetrating member to penetrate the seal, and means arresting movement of the penetrating member upon penetration thereby of the seal.

2. The combination comprising, a support, a pressure vessel containing pressure fluid and sealed by a penetratable seal, a penetrating member axially movably mounted on the support and engageable with the seal to penetrate the seal and release the pressure fluid, means biasing the penetrating member into engagement with the seal, a generally hollow cylindrical frangible glass member, seat means on the penetrating member and support for axially seating the glass member therebetween to hold the penetrating member against movement under the action of the biasing means, cooperating means on the seat means and glass member applying a hoop stress to the glass member under the action of the biasing means, fragmentizing means engageable with the glass member upon receipt thereof of an acceleration pulse of predetermined amplitude and time to fragmentize the glass member and release the penetrating member to penetrate the seal, and means arresting movement of the penetrating member upon penetration thereby of the seal.

3. The combination comprising, a support, a pressure vessel containing pressure fluid and sealed by a penetratable seal, a penetrating member axially movably mounted on the support and engageable with the seal to penetrate the seal and release the pressure fluid, a generally hollow cylindrical frangible glass member, generally axially and radially directed seat means on the support and penetrating member seating the open ends of the glass member, means applying an axial bias to the penetrating member to bias the penetrating member into engagement with the seal and cooperate with the seat means in applying a hoop stress to the glass member, fragmentizing means engageable with the glass member upon receipt thereof of an acceleration pulse of predetermined amplitude and time to fragmentize the glass member and release the penetrating member to penetrate the seal, and means arresting movement of the penetrating member upon penetration thereby of the seal.

4. The combination comprising, a support including an axially apertured radial wall, a pressure vessel containing pressure fluid and sealed by a penetratable seal, a penetrating member freely axially movable through the wall aperture for movement into penetrating engagement with the seal to release the pressure fluid, a generally hollow cylindrical frangible glass member seated on the wall radially of the aperture and seated on the penetrating member to hold the penetrating member against movement into penetrating engagement with the seal, means applying an axial bias to the penetrating member to seat the glass member on the penetrating member and wall and bias the penetrating member into engagement with the seal, fragmentizing means engageable with the glass member upon receipt thereof of an acceleration pulse of predetermined amplitude and time to fragmentize the glass member and release the penetrating member for engagement with the pressure vessel seal, a resilient apertured member seated on the wall and sealingly receiving the penetrating member therethrough, the resilient member sealing the wall aperture against movement of glass member fragments therethrough upon fragmentation of the glass member by the fragmentizing means, and cooperating means on the penetrating member and resilient member arresting movement of the penetrating member therethrough upon penetration thereby of the seal.

5. The combination comprising, a support including an axially spaced pair of generally radially extending walls, one of the walls including an axial aperture therethrough, a pressure vessel containing pressure fluid and sealed by a penetratable seal, a guide member secured to the other wall of the support and extending axially of the aperture in the one wall, a penetrating member slidably supported by the guide member and including a head portion and a shank portion freely axially movable within the aperture of the one wall of the support and into penetrating engagement with the pressure vessel seal to release the pressure fluid, axially and radially tapered opposed seats on the one wall of the support and the head portion of the penetrating member, a generally hollow cylindrical frangible glass member receiving the seats within the open ends thereof to hold the penetrating member against movement into penetrating engagement with the pressure vessel seal, resilient means seating on the other wall of the support and on the head portion of the penetrating member to apply an axial bias to the penetrating member and cooperate with the seats in applying a hoop stress to the glass member and to bias the penetrating member toward engagement with the pressure vessel seal, fragmentizing means engageable with the glass member upon receipt thereof of an acceleration pulse of predetermined amplitude and time to fragmentize the glass member and release the penetrating member for engagement with the pressure vessel seal, a resilient apertured member seated on the one wall of the support and sealingly engaging the shank portion of the penetrating member, the resilient member sealing the aperture of the one wall against movement of glass member fragments therethrough upon fragmentation of the glass member by the fragmentizing means, the head portion of the penetrating member engaging the resilient member upon penetration of the pressure vessel seal by the penetrating member to resiliently arrest movement of the penetrating member under the action of the resilient means.

* * * * *